(12) United States Patent
Bohannon (10) Patent No.: US 9,787,643 B2
(45) Date of Patent: Oct. 10, 2017

(54) TRANSPORT LAYER SECURITY LATENCY MITIGATION

(71) Applicant: Facebook, Inc., Menlo Park, CA (US)

(72) Inventor: Philip Lewis Bohannon, Cupertino, CA (US)

(73) Assignee: Facebook, Inc., Menlo Park, CA (US)

( * ) Notice: Subject to any disclaimer, the term of this patent is extended or adjusted under 35 U.S.C. 154(b) by 0 days.

(21) Appl. No.: 14/610,870

(22) Filed: Jan. 30, 2015

(65) Prior Publication Data

US 2016/0226827 A1 Aug. 4, 2016

(51) Int. Cl.
*G06F 9/00* (2006.01)
*H04L 29/08* (2006.01)
*H04L 29/06* (2006.01)

(52) U.S. Cl.
CPC ........ *H04L 63/0281* (2013.01); *H04L 63/061* (2013.01); *H04L 63/0823* (2013.01); *H04L 63/168* (2013.01)

(58) Field of Classification Search
CPC ....................................................... H04L 47/70
USPC ........ 713/153, 155, 164, 166, 168; 726/2, 7, 726/12
See application file for complete search history.

(56) References Cited

U.S. PATENT DOCUMENTS

| | | | | |
|---|---|---|---|---|
| 8,874,761 | B2 * | 10/2014 | Backholm | H04L 65/4084 455/408 |
| 2010/0146135 | A1 * | 6/2010 | Evans | H04L 12/185 709/231 |
| 2012/0077461 | A1 * | 3/2012 | Das | H04L 63/0884 455/410 |
| 2016/0119287 | A1 * | 4/2016 | Khazan | H04L 63/0428 726/12 |

OTHER PUBLICATIONS

"Transparent vs Direct Proxies"—Netbox Blue, Jun. 2013 http://netboxblue.com/sites/2012.netboxblue.com/files/Application%20Brief%20-%20Direct%20vs%20Transparent%20Proxy-v1.1-Nov13_0.pdf.*
"A Few Thoughts on Cryptographic Engineering: What's TLS Snap Start" Dec. 24, 2011 [Online] "http://blog.cryptographyengineering.com/2011/12/whats-tls-snap-start.html" Retrieved Jan. 20, 2015, pp. 3.
"RFC 5246—The Transport Layer Security (TLS) Protocol Version 1.2" Aug. 2008 [Online] "http://tools.ietf.org/html/rfc5246" p. 63 & 64 [tools.ietf.org] Retrieved Jan. 20, 2015.
Langley et al. "Transport Layer Security (TLS) False Start draft-bmoeller-tls-falsestart-00" Jun. 2, 2010 [Online] "https://tools.ietf.org/html/draft-bmoeller-tls-falsestart-00" Retrieved Jan. 20, 2015, pp. 11.
"Transport Layer Security (TLS) :: Chapter 9. Upper-Layer Authentication :: Part II The Design of Wi-Fi Security" Accessed Jan. 20, 2015 [Online] http://etutorials.org/Networking/802.11+security+wi-fi+protected+access+and+802.11i/Part+II+The+Design+of+Wi-Fi+Security/Chapter+9.+Upper-Layer+Authentication/Transport+Layer+Security+TLS/ [etutorials.org], pp. 6.

* cited by examiner

*Primary Examiner* — Randy Scott
(74) *Attorney, Agent, or Firm* — Perkins Coie LLP (57) ABSTRACT

Some embodiments include a method of utilizing a proxy device to mitigate latency related to a transport layer security (TLS) handshake protocol. The proxy device can be an untrusted proxy of a server or a client. The proxy device can negotiate cipher suites on behalf of its principal (e.g., the server or the server) without storing private keys of its principal. The use of the proxy device can reduce a typical two round-trips taken between the server and the client into a single round-trip.

19 Claims, 6 Drawing Sheets

TRANSPORT LAYER SECURITY LATENCY MITIGATION

BACKGROUND

Various client and server platforms utilize authentication protocol suites to protect communication across a wide area network (WAN), e.g., the Internet. The authentication protocol suite can include Transport Layer Security (TLS), Secure Sockets Layer (SSL) version 3.0, SSL version 2.0, and/or Private Communications Transport (PCT). These authentication protocols are based on a client/server model. Typically, a client sends a message to a server, and the server responds with the information needed to authenticate itself. The client and server perform an additional exchange of session keys (e.g., cryptography keys), and the authentication dialogue ends. When authentication is completed, secure communication can begin between the server and the client using the secret keys established during the authentication process.

An authentication protocol can be layered between the application protocol layer and the transport layer (e.g., the transmission control protocol (TCP) layer), where it can secure and send application data to the transport layer. Because the authentication protocol works between the application layer and the transport layer, it can support multiple application layer protocols. The authentication protocol assumes that a connection-oriented transport, typically TCP, is in use. The authentication protocol allows client/server applications to detect the security risks, such as message tampering, message interception, and message forgery.

The authentication protocol includes a handshake protocol. The handshake protocol usually takes two roundtrips to complete between a client and a server. If the client has previously established a secured session with the server, the handshake protocol also enables the client to resume the secured session and thus reducing the latency associated with re-establishing the secured session. The session resume feature, however, is not useful in applications where a client needs to communicate with many different servers. Normally, these two roundtrips do not significantly delay network communication. However, some network environments utilize high-latency relays (e.g., in rural areas). In some cases, the high-latency relay is only active during certain periods of time (e.g., a moving vehicle, a satellite, a drone, etc.). In these cases, the two roundtrips of the handshake protocol represent a significant challenge in secured network communication.

The figures depict various embodiments of this disclosure for purposes of illustration only. One skilled in the art will readily recognize from the following discussion that alternative embodiments of the structures and methods illustrated herein may be employed without departing from the principles of embodiments described herein.

DETAILED DESCRIPTION

This disclosure is directed to adding an untrusted proxy between a client device and a server device to speed up latencies associated with an authentication protocol handshake (e.g., a TLS handshake). Conventionally, the TLS protocol requires two round trips of messages between a client device and a server device to complete a handshake (e.g., governed by the handshake protocol of the TLS protocol). Respectively, the first round trip corresponds to a client/server "hello" message that negotiates a cipher suite to use and the second round trip corresponds to a client/server exchange of cryptographic parameters (e.g., keys) to establish a specific set of session keys according to the negotiated cipher suite. The client device and the server device can then use the session keys to encrypt and sign outgoing messages and decrypt and authenticate incoming messages.

In several embodiments, an untrusted proxy is introduced to mitigate latencies associated with an authentication protocol handshake. The untrusted proxy can reduce the handshake protocol to a single round trip between the client device and the server device. This feature advantageously reduces the latency in high latency relay systems, such as communication systems proposed for rural areas. By reducing the number of handshake protocol messages that are exchanged, these embodiments can increase session initiation speeds, reduce network congestion, and generally improve data communications performance for users located in rural areas who connect to WANs using these high-latency relay systems. In these embodiments, TLS negotiation can be conducted in the clear, so that visibility, even long-term, to intermediate nodes is not necessarily a security risk. For example, one party can pre-push data values used in the protocol, but not private keys, to the un-trusted proxy. The proxy can conduct initial phases of protocol exchange then "hand off" the connection.

For illustrative purposes, several embodiments are described in reference to the TLS protocol (e.g., by describing how to reduce the number of roundtrips between the client device and the server device in a TLS handshake). However, it is understood that the disclosed system and methods can be applied to predecessors and successors of the TLS protocol, and other types of authentication protocol suites that implement a handshake protocol.

In some embodiments, a server proxy is implemented on the client side of a communication network with a high-latency relay. The server proxy stores pre-generated server hello messages that can respond to future client hello messages without waiting for the server device to generate a responding hello message. In these embodiments, the server proxy mitigates the latency associated with an high-latency communication network without modifying the TLS handshake protocol. In several embodiments, client devices need not be modified to utilize the disclosed method of latency mitigation. In several embodiments, while the server device is reconfigured to communicate with the server proxy to send the pre-generated server hello messages, the network hardware and network protocol module of the server device need not be reconfigured.

In some embodiments, a client proxy is implemented on the server side of a communication network with a high-latency relay. The client device can send, to the client proxy, both the client hello message and a prediction of a cipher suite (e.g., a cryptographic protocol) that the server device is likely to choose. The predicted cipher suite can include one or more cipher suite parameters (e.g., a public key or a group parameter). The client proxy can forward the client hello message to the server device. The server device can respond to the client proxy with a server hello message and a server certificate, having selected a cipher suite that matches the predicted cipher suite made by the client device. In response, the client proxy can generate a key exchange message including a cryptographic parameter (e.g., a Pre-Master Secret) corresponding to the verified cipher suite consistent with the server certificate. The client proxy can provide the key exchange message to the server device without waiting for the client device to approve.

In several embodiments, a proxy is introduced between a client device and a server device to facilitate a TLS handshake. In these embodiments, the proxy saves at least a round trip of messages when completing the TLS handshake without modifying the TLS handshake protocol. In these embodiments, the server proxy is an untrusted proxy in the sense that the private keys and private secrets of the principal device are not shared with the proxy. This enables the convenience of having mitigated the latency associated with TLS handshake, but without the potential breach of security associated with using a fully trusted proxy.

Figure 1:
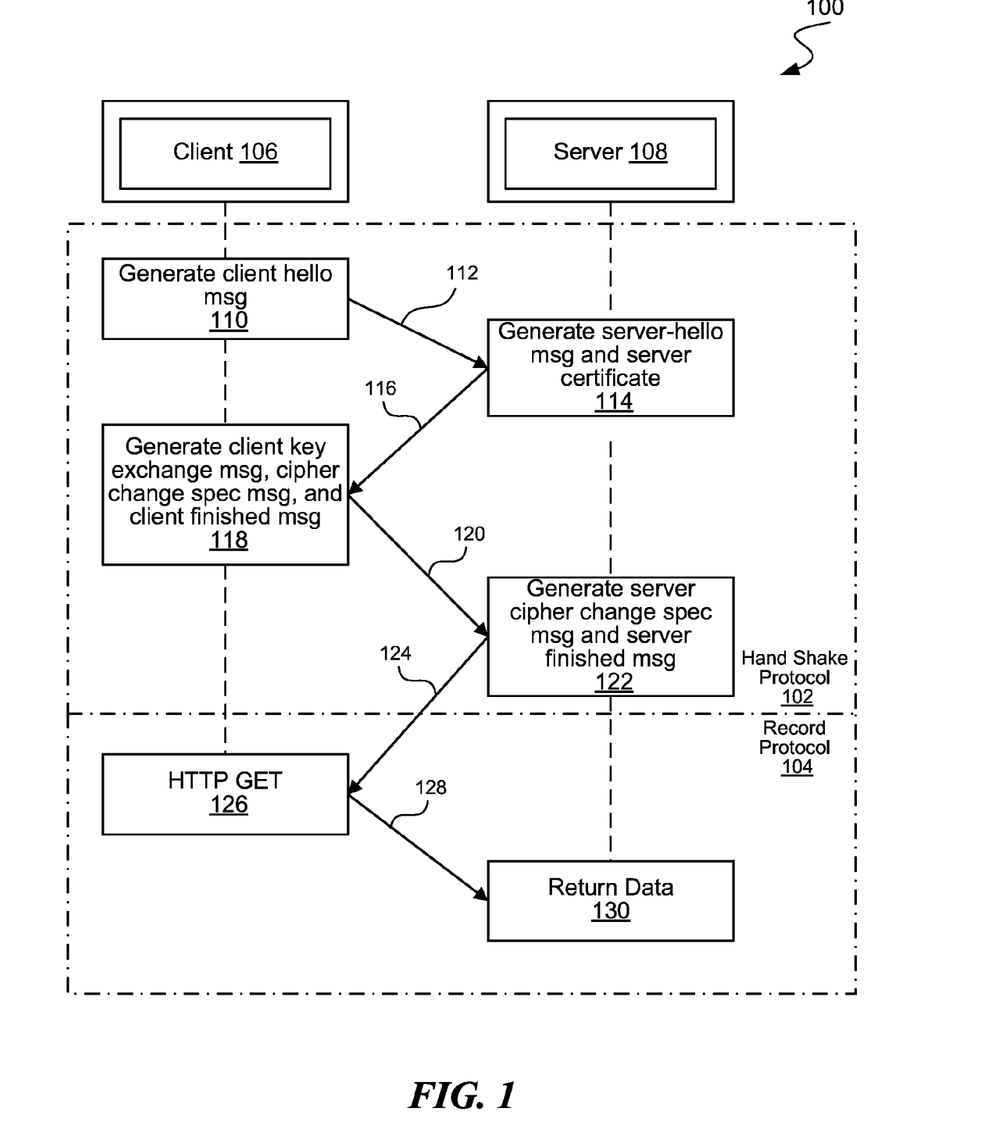
FIG. 1 is a flow chart illustrating a handshake protocol and a record protocol according to the TLS protocol.

Turning now to the figures, FIG. 1 is a flow chart illustrating a handshake protocol 102 and a record protocol 104 according to a TLS protocol 100. The TLS protocol 100 involves a client device 106 and a server device 108. The client device 106 can be a computing device, such as the computing device 600 of FIG. 6. The server device 108 can be a computing device, such as the computing device 600.

The handshake protocol 102 begins at block 110, where the client device 106 generates a client hello message. The client device 106 can initiate a secured session by sending the client hello message to the server device 108 (e.g., indicated by arrow 112). The client hello message can include a version number (e.g., the version number of the highest version that the client device 106 supports). The client hello message includes a client random number (e.g., a 4-byte number that consists of a time stamp, such as a date and time, plus a 28 byte cryptographically generated pseudorandom number). The client random number is used in the calculation of the Master Secret from which a set of session keys are derived.

Optionally, the client hello message can include a session identification (ID). The session ID is a byte string used to identify an active or recent global session state. The session ID enables the client device 106 to resume a previous session. The server device 108 can maintain a server session cache that allows for session resumes. This feature is the conventional method of mitigating latency when using the TLS protocol 100. However, this is only beneficial if the client device 106 needs to repeatedly communicate to the same server device. The client hello message can also include a cipher suite, which is a list of ciphers schemes available on the client device 106. Optionally, the client hello message includes one or more compression algorithms supported by the client device 106. The client hello message can be used to either start a new session or to resume an existing session (e.g., by including a session ID). The client device sends the client hello message to the server device 108 as indicated by arrow 112.

In response to the client hello message, the server device 108 generates a server-side hello message and a server certificate at block 114. The server device 108 sends the server side hello message and the server certificate to the client device 106 as indicated by arrow 116. The server hello message includes a version number (e.g., the highest version number that is supported by both the client device 106 and the server device 108). The server hello message includes a server random number (e.g., a 4-byte representation of a server timestamp plus a 28 byte, cryptographically generated, pseudorandom number). This number, along with the client random number, is used by both the client device 106 and the server device 108 to generate the Master Secret from which a set of session keys will be derived.

The server hello message also includes a session ID. The session ID can correspond to a new session ID, a resumed session ID, or null. The session ID may correspond to a new session when the client device 106 did not indicate a session to resume in the client hello message. A new session ID is also generated when the client indicates a session to resume, but the server device 108 cannot or will not resume that session. The session ID can correspond to a resumed session ID as indicated in the client hello message and as verified by the server device 108. The session ID may be null if the server device 108 is unwilling to resume the new session at a later time.

The server hello message also includes a cipher suite selected by the server device 108. The cipher suite in the server hello message is selected as the strongest cipher that both the client device 106 and the server device 108 support. If there are no cipher suites that both parties support, the session is ended with a handshake failure alert. In some cases, the server hello message can include a compression algorithm. If the server hello message specifies a compression algorithm, then the compression algorithm is used subsequently for communication via the TLS protocol 100. The server hello message may be followed by a server hello done message, which indicates that the server device 108 is finished and waiting for a response from the client device 106.

The server certificate can include a certificate list. The certificate list includes a server public key or other public cipher suite parameter(s) of the server device 108 corresponding to the selected cipher suite. The certificate list can include one or more other validating certificates. The client device 106 can use the server public key to authenticate the server device 108 and to encrypt a Pre-Master Secret. The Pre-Master Secret is a client-generated number encrypted with the server public key. The server certificate can also include the name of the server device 108 such that the client device 106 can verify that it matches the name the client device 106 intended to connect.

Optionally at block 114, the server device 108 can generate a temporary key as part of a server key exchange message, and optionally at arrow 116, the server device 108 can send the server key exchange message to the client device 106. This key can be used by the client device 106 to encrypt the client key exchange message later in the handshake protocol 102. The step is only required when the server certificate does not contain a public key that is suitable for key exchange or when the cipher suite mandates the use of an ephemeral key for the key exchange operation. In these situations, the server device 108 must create and send a temporary key that is used instead of the server public key. The key that is created depends on the cipher suite.

At block 118, the client device 106 generates a client key exchange message, a client change spec message and a client finished message. At arrow 120, the client device 106 sends the client key exchange message, the client change spec message, and the client finished message to the server device 108.

The client device 106 generates the client key exchange message by generating the Pre-Master Secret as a number string. The Pre-Master Secret can be generated using the client random number and the server random number. When generating the client key exchange message, the client device 106 can encrypt the Pre-Master Secret encrypted by the server public key in the server certificate. Both parties (e.g., the client device 106 and the server device 108) can compute the Master Secret locally and derive the session keys from it. If the server device 108 can decrypt the Pre-Master Secret, the client device 106 is assured that the server device 108 has the correct private server key. The step is crucial to prove the authenticity of the server device 108. Only the server device 108 with the server private key that matches the server public key in the server certificate can decrypt the Pre-Master Secret and continue the protocol negotiation.

The client key exchange message includes a protocol version and the Pre-Master Secret. The protocol version is the same version number as sent in the client hello message. The protocol version can be used by the server device 108 to verify that the client key exchange message originates from the same device as the client hello message. The Pre-Master Secret is used with the client random number and the server random number to create the Master Secret.

The client change spec message notifies the server device 108 that future messages including the client finished message are going to be encrypted or decrypted using the session keys and the negotiated cipher suite. At this point, the client device 106 and the server device 108 have authenticated each other and the client device 106 has sent the Pre-Master Secret. Both the client device 106 and the server device 108 can calculate the Master Secret independently. Up until this point, messages between the server device 108 and the client device 106 are protected (e.g., encrypted and decrypted) using one or more asymmetric key pairs (e.g., private/public keys) of the server device 108 and/or the client device 106. The client change spec message informs the server device 108 that the client device 106 is ready to use at least one of the session keys for all further encryption.

The handshake protocol 102 securely exchanges data that is used to create the Master Secret. The Master Secret, however, is never used by itself in the encryption; rather, several session keys are derived from the Master Secret. These session keys are then used for message authentication and encryption. The Master Secret results from the pseudorandom material that is exchanged in the client hello message and server hello message. Both the server device 108 and the client device 106 can create the Master Secret. It is never exchanged. To create the Master Secret, each device passes the Pre-Master Secret (e.g., a 48-byte variable), a literal phrase (e.g., "Master Secret"), and a concatenation of the client random number and the server random number to a pseudorandom function (PRF) resulting in the Master Secret.

The Master Secret enables encryption and hashing of subsequent network communications. For example, the server device 108 and the client device 106 can create one or more of the following session keys, including: a client write MAC secret, a server write MAC secret, a client write key, and a server write key. Each device can generate these session keys by passing the Master Secret through the PRF until enough output has been generated to yield a value that is divided into six parts.

The client write MAC secret is a key added to client message hashes. The client device 106 uses the client write MAC secret to create the initial hash. The server device 108 uses it to authenticate client messages. The server write MAC secret is a key added to server message hashes. The server device 108 uses the server write MAC secret to create the initial hash. The client device 106 uses it to authenticate server messages. The client write key is a key used by the client device 106 to encrypt messages. The server device 108 uses the client write key to decrypt client messages. The server write key is a key used by the server device 108 to encrypt messages. The client device 106 uses the server write key to decrypt server messages.

The client finished message is a hash of the entire conversation thus far, which provides further authentication of the client device 106. This message is a verification that the client device 106, who is sending the client finished message is truly the client device 106 who sent the client hello message.

At block 122, in response to receiving the client key exchange message, the server device 108 can generate a server change spec message. The server device 108 can also generate the server finished message (e.g., in response to receiving the client finished message). At arrow 124, the server device 108 can send the server change spec message and the server finished message. If the server device 108 has a copy of the server private key corresponding to the server public key, it can decrypt the client key exchange message to compute the Master Secret. Utilizing the Master Secret, the server device 108 can then generate a matching set of session keys (e.g., encryption and MAC keys). The server change spec message can be a request to communicate with symmetric key cryptography, so that both parties have acknowledged that they will use the negotiated cipher suite and the computed session keys that they have agreed upon. The server change spec message notifies the client device 106 that the server device 108 will begin hashing and/or encrypting messages with the session keys that were negotiated. The server device 108 switches its record layer security state to symmetric encryption using the session keys generated from the Master Secret.

The server finished message is a hash of the entire exchange (e.g., up to this point) using the server write key and the server MAC secret. If the client device 106 can successfully decrypt this message and validate the contained hashes, the client device 106 is assured that the TLS handshake was successful, and the session keys computed on the client device 106 match those computed on the server device 108. The server finished message has a different literal phrase (e.g., "server finished") compared to the client finished message. In several embodiments, the server finished message includes the client finished message. The server device 108 can use the server write MAC secret and the server write key for hashing and encrypting to communicate in the record protocol 104.

The handshake protocol 102 can transition to the record protocol 104 after the server finished message is sent at arrow 124. For example, the client device 106 can generate a hypertext transfer protocol (HTTP) GET request at block 126. The HTTP GET request can be hashed and encrypted using the client write MAC secret and the client write key. The client device 106 can send the HTTP GET request as indicated by arrow 128. At block 130, the server device 108 can return the requested data as hashed and encrypted using the server write MAC secret and the server write key.

Figure 2:
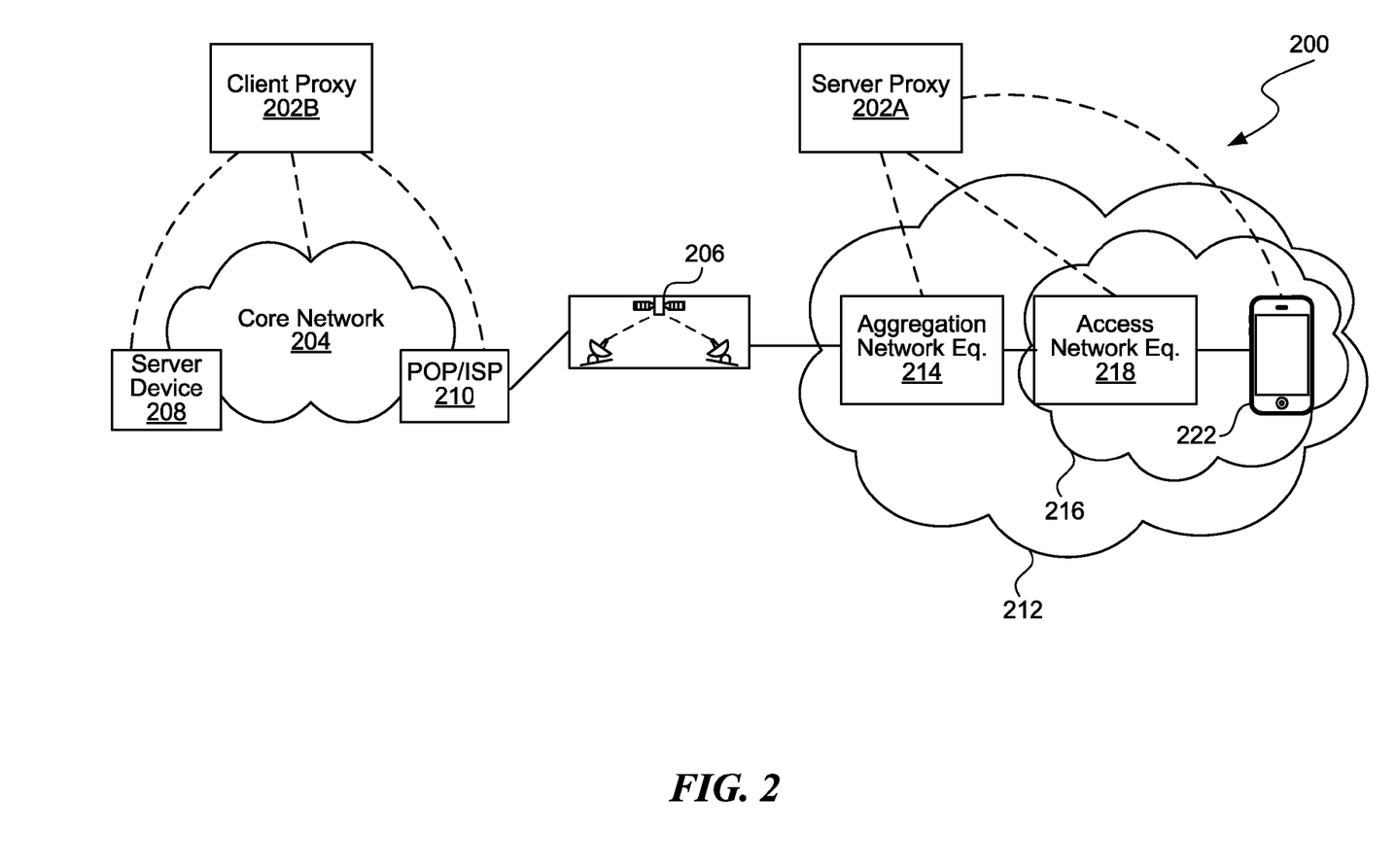
FIG. 2 is a block diagram illustrating a high-latency rural network, in accordance with various embodiments.

FIG. 2 is a block diagram illustrating a high-latency rural network 200, in accordance with various embodiments. A proxy engine (e.g., a server proxy 202A and/or a client proxy 202B) can be implemented in the high-latency rural network 200. The server proxy 202A can be implemented on the client side and the client proxy 202B can be implemented on the server side.

On the server side is a core network 204. The core network 204 can be a wide area network (WAN) or a local area network (LAN). The core network 204 can be the Internet. The core network 204 can be connected to the client-side via a backhaul network 206. The backhaul network 206 can be a high-latency network with a high-latency relay. The backhaul network 206 can separate the client side from the server side. The backhaul network 206 can be a mobile network established by a moving relay (e.g., a train, a satellite, or a drone). The backhaul network 206 can have intermittent network connection. The core network 204 comprises multiple interconnected computing devices and computer servers. For example, the core network 204 can include a server device 208 and an internet service provider (ISP) point of presence (POP) 210.

In some embodiments, the client proxy 202B can be implemented at the ISP POP 210 or the server device 208. In some embodiments, the client proxy 202B can be implemented as a standalone device coupled to the ISP POP 210, the core network 204, or the server device 208. Because the client proxy 202B is an untrusted proxy, the client proxy 202B can be the on trusted proxy for multiple server devices. The closer the client proxy 202B is implemented toward the backhaul network 206, the more server devices can benefit from the client proxy 202B.

On the client side of the backhaul network 206 can be an aggregation network 212 established by an aggregation network equipment 214. The aggregation network equipment 214 can include one or more access networks (e.g., an access network 216) implemented by one or more access network equipment (e.g., an access network equipment 218). The aggregation network equipment 214 can be, for example, a radio network controller (RNC), a base station controller (BSC), or a microwave controller. The access network equipment 218, for example, can be a 3G base station, a Wi-Fi access point, or a router. For example, a client device 222 can be connected to the access network 216.

In some embodiments, the server proxy 202A can be implemented at the aggregation network equipment 214, the access network equipment 218, or the client device 222. In some embodiments, the server proxy 202A can be implemented as a standalone device in the aggregation network 212 or the access network 216.

Figure 3:
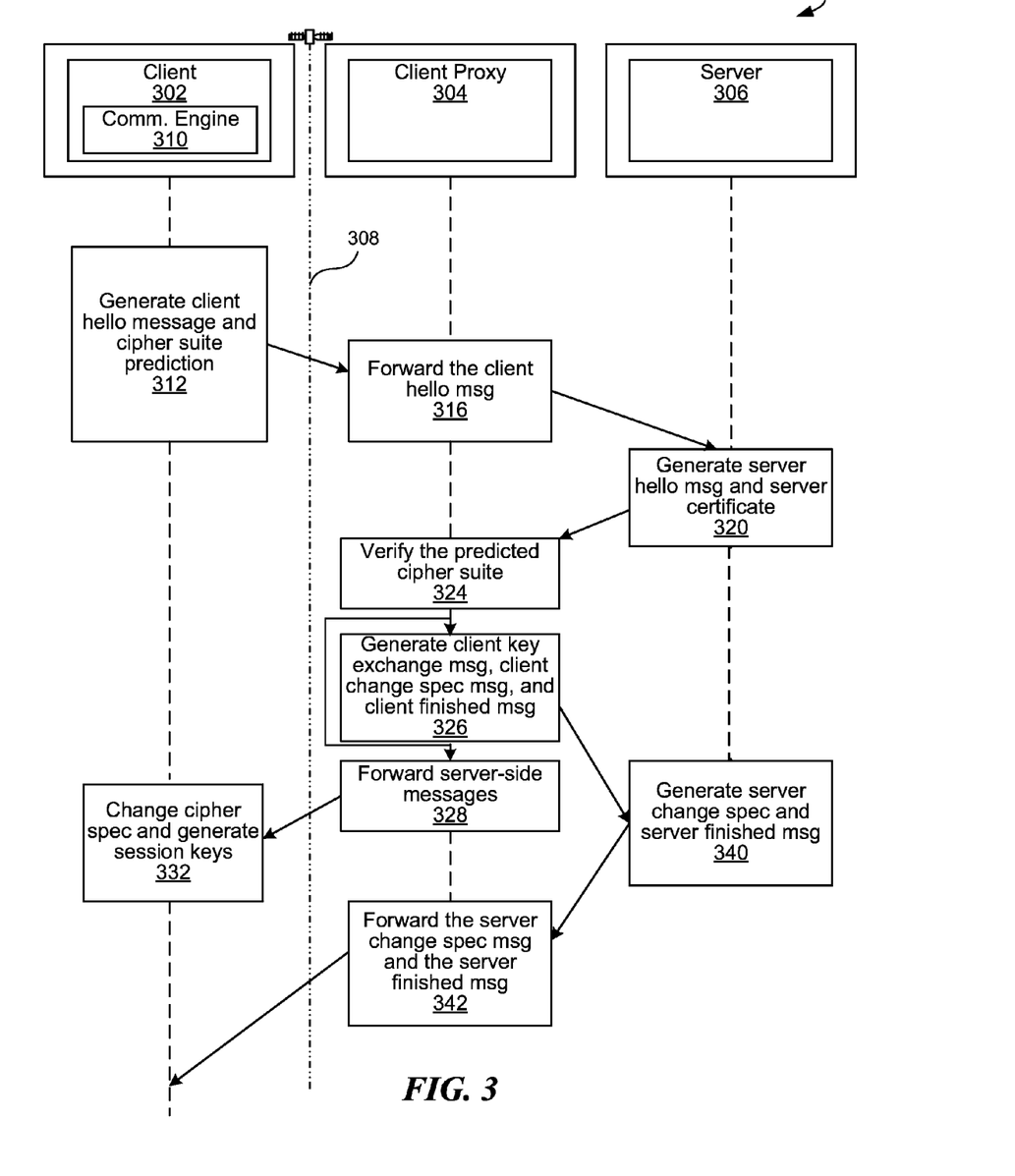
FIG. 3 is a flow chart illustrating a method of performing a TLS handshake utilizing a client proxy, in accordance with various embodiments.

FIG. 3 is a flow chart illustrating a method 300 of performing a TLS handshake utilizing a client proxy, in accordance with various embodiments. The method 300 can involve a client device 302 (e.g., the client device 222), a client proxy 304 (e.g., the client proxy 202B), and a server device 306 (e.g., the server device 208). In some embodiments, the client proxy 304 is a computing device (e.g., the computing device 600 of FIG. 6). In some embodiments, the client proxy 304 is a module implemented by executable instructions that runs on the server device 306 or on a device on the server side of a communication network, such as the high-latency rural network 200 of FIG. 2. A high-latency edge 308 (e.g., the backhaul network 206 of FIG. 2) represents a network chokepoint where communication of the TLS handshake may be delayed. In some embodiments, the client device 302 can implement a communication engine 310 that implements the process steps in the method 300 involving the client device 302. The communication engine 310 can introduce the client proxy 304 into the TLS handshake without modifying the TLS protocol.

The client device 302 can generate a client hello message and a prediction of a cipher suite at block 312. The client hello message can include a client random number. The client device 302 can send the client hello message to the client proxy 304. The client hello message and the predicted cipher suite enable the client proxy 304 to generate a client key exchange message in response to receiving a server hello message. In some embodiments, the client device 302 can achieve this by retaining knowledge of server public keys for key exchanges. In some embodiments, the client device 302 can track all potential cipher suites that servers may select by maintaining a server suite database. For example, the server suite database can retain knowledge of "group parameters" for cipher suites that have limited number of parameter permutations. For example, the group parameters can include an elliptical curve, a "p" value, and/or a "g" value if a cipher suite involves a Diffie Hellman (DH) key agreement protocol or an elliptic curve Diffie Hellman (ECDH) key agreement protocol. In some embodiments, the server suite database can store public keys associated with servers that are tracked. In some embodiments, the server suite database, partly or in whole, and/or the server public keys can be cached on the client proxy 304.

At block 316, the client proxy 304 can forward the client hello message to the server device 306, in response to receiving the client hello message. At block 320, the server device 306 can generate a server hello message and a server certificate in response to receiving the client hello message. The server hello message can include a server random number. The server hello message can indicate a cipher suite selected by the server device 306. The server certificate can include a server public key and/or cipher suite parameters according to the selected cipher suite. The server device 306 can send the server hello message and the server certificate to the client proxy 304. In several embodiments, the server device 306 treats the client proxy 304 as its client. In some embodiments, the server device 306 is oblivious of the existence of the client device 302 or oblivious that the client proxy 304 is proxying for another device.

At block 324, the client proxy 304 verifies that a selected cipher suite indicated in the server hello message corresponds to the predicted cipher suite received earlier. At block 326, in response to determining that the selected cipher suite matches the predicted cipher suite, the client proxy 304 can generate and send the client key exchange message to the server device 306. The client key exchange message can include a Pre-Master Secret generated based on the client random number in the client hello message and/or the server random number in the server hello message. In some embodiments, the client proxy 304 can access a pre-encrypted Pre-Master Key from the client device 302 as part of the cipher suite prediction. In these embodiments, the client proxy 304 does not have access to the Pre-Master Secret. In some embodiments, the client proxy 304 can encrypt the Pre-Master Secret utilizing the server public key in the server certificate or other cipher suite parameters corresponding to the selected cipher suite. If the selected cipher suite does not match the predicted cipher suite, then the client proxy 304 would have to request a corrected client key exchange message from the client device 302 (not shown).

In some embodiments, at block 312, the client device 302 sends multiple predictions of cipher suites. In these embodiments, at block 324, the client proxy 304 can determine which of the predicted cipher suites matches the selected cipher suite in the server certificate. If a match is found, the client proxy 304 can then generate and send the matching client key exchange message to the server device 306.

In several embodiments, the client proxy 304 also generates and sends a client change spec message and a client finished message at block 326. The client proxy 304 can send the client change spec message and the client finished message to the server device 306 (e.g., to continue handshake) and the client device 302 (e.g., to verify correctness and track proxy activity). The client change spec message notifies the server device 306 that future communication from the client proxy 304 and/or the client device 302 are going to be encrypted with the session keys agreed on by both sides (e.g., derived from a Master Secret that is derived from the client random number, the server random number, and the Pre-Master Secret). The client finished message is generated by hashing the communications between the client device 302 and the server device 306 thus far using at least one of the session keys.

At block 328, also in response to verifying that the predicted cipher suite matches the selected cipher suite, the client proxy 304 sends the server hello message and the server certificate to the client device 302. In some embodiments, the client proxy 304 can execute block 326 simultaneously to or immediately before block 328. In some embodiments, the client proxy 304 can execute block 326 immediately after block 328.

At block 332, the client device 302 can change the cipher specification by generating session keys based on the negotiated parameters (e.g., the server random number, the client random number, and the selected cipher suite parameters). To generate the sessions keys, the client device 302 can compute a Master Secret for the TLS session. The client device 302 can generate the Master Secret based on the Pre-Master Secret, the client random number, and the server random number. Block 332 can be in response to block 328. The client device 302 can use the session keys to encrypt and sign future messages to the server device 306 and decrypt and authenticate future messages from the server device 306.

At block 340, the server device 306 can generate a server finished message and a server change spec message based on the client finished message, the client key exchange message, and the client finished message (e.g., all sent by the client proxy 304 at block 326). The server device 306 can generate the session keys using the negotiated cryptography parameters (e.g., the server random number, the client random number, and the Pre-Master Secret). The server device 306 can send the server finished message and the server change spec message to the client proxy 304. At block 342, the client proxy 304 can forward the server finished message and the server change spec message to the client device 302 to complete the TLS handshake.

In several embodiments, the method 300 reduces the number of roundtrips through the high-latency edge 308 from two to one for the TLS handshake. The method 300 has a security advantage because the client proxy 304 is untrusted. The method 300 is also advantageous in that it does not change the TLS protocol. While the method 300 includes modifying the client device 302, it does not modify the server device 306.

Figure 4:
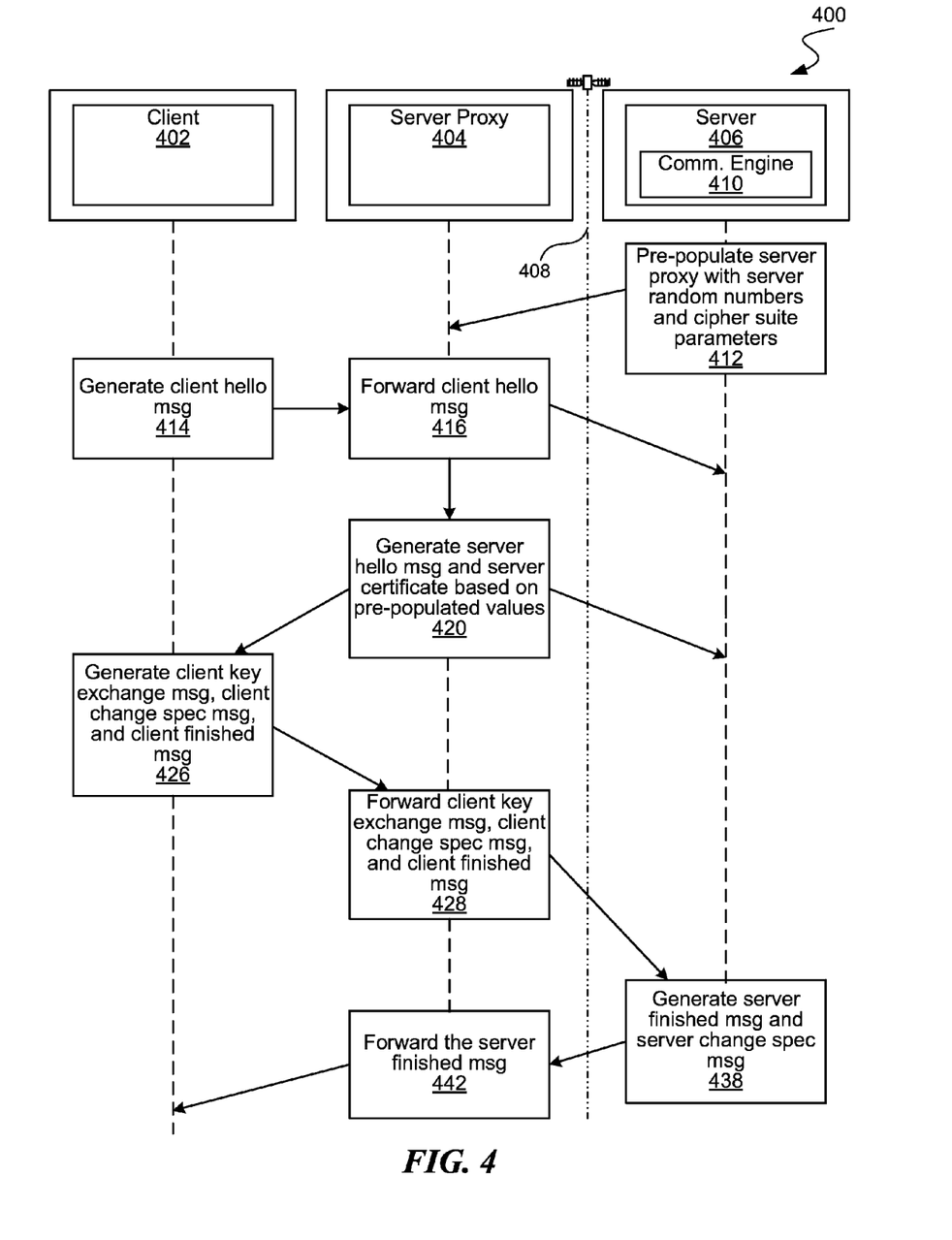
FIG. 4 is a flow chart illustrating a method of performing a TLS handshake utilizing a server proxy, in accordance with various embodiments.

FIG. 4 is a flow chart illustrating a method 400 of performing a TLS handshake utilizing a server proxy, in accordance with various embodiments. The method 400 can involve a client device 402 (e.g., the client device 222), a server proxy 404 (e.g., the server proxy 202A), and a server device 406 (e.g., the server device 208). In some embodiments, the client device 402 can be the client proxy 304. In some embodiments, both the method 300 and the method 400 are implemented to perform a TLS handshake.

Figure 6:
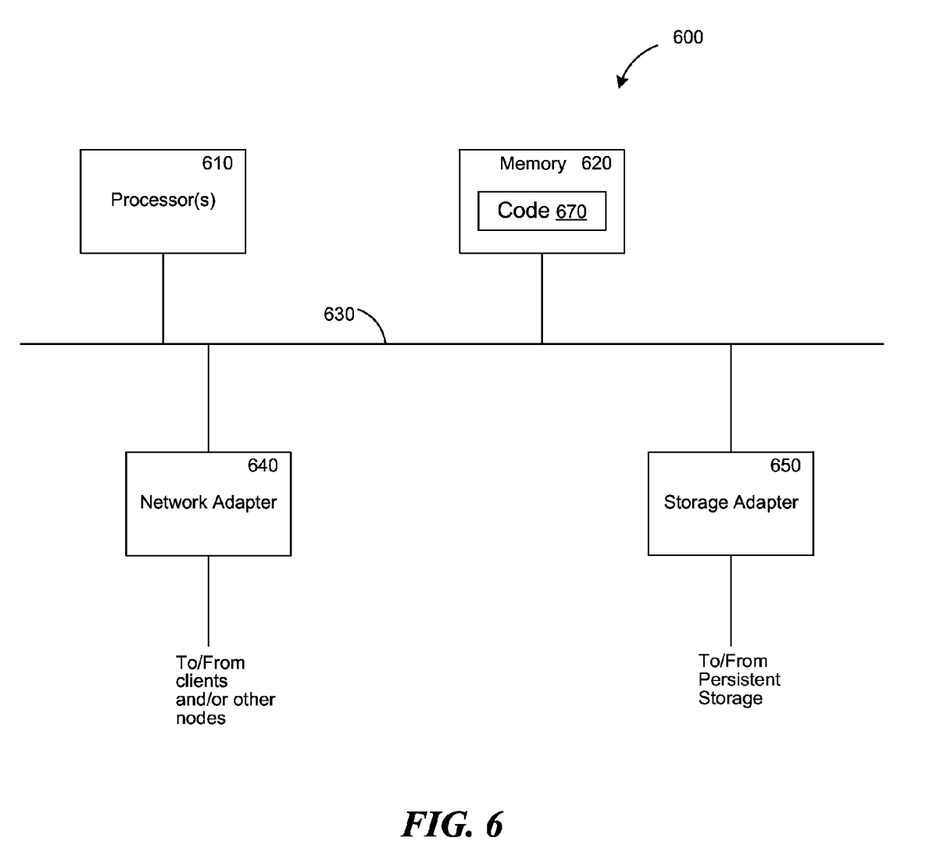
FIG. 6 is a block diagram of an example of a computing device, which may represent one or more computing device or server described herein, in accordance with various embodiments.

In some embodiments, the server proxy 404 is a computing device (e.g., the computing device 600 of FIG. 6). In some embodiments, the server proxy 404 is a module implemented by executable instructions that runs on the client device 402 or on a device on the client side of a communication network, such as the high-latency rural network 200 of FIG. 2. A high-latency edge 408 (e.g., the backhaul network 206 of FIG. 2) represents a network chokepoint where communication of the TLS handshake may be delayed. In some embodiments, the server device 406 can implement a communication engine 410 that implements the process steps in the method 400 involving the server device 406. The communication engine 410 can introduce the server proxy 404 into the TLS handshake without modifying the TLS protocol.

At block 412, the server device 406 can pre-populate the server proxy 404 with one or more server random numbers and one or more cipher suite parameters (e.g., server certificate chain, server public key, "g" and "p" values of a cipher suite, elliptical curve exchange values, Diffie-Hellman exchange values, or any combination thereof). This process step can occur before any TLS handshake begins such that the process step does not cost latency associated with the TLS handshake. Each server random number enables the server proxy 404 to generate a server hello message. The server proxy 404 can generate a timestamp for the server hello message. The server proxy 404 can also select a cipher suite on behalf of the server device 406 according to the pre-populated cipher suite parameters. The cipher suite parameters enable the server proxy 404 to generate a server certificate. In some embodiments, the server device 406 can also send the server proxy 404 a set of potential future session IDs.

For example, the server device 406 can send pre-populated values corresponding to a set of future server certificate messages. This pre-population can occur before and asynchronous from any corresponding client hello message. The pre-populated values can include, for example, block of random numbers generated by the server device 406; copy of the certificate chain of the server device 406; a set of potential future session IDs; block of cipher suite secrets (e.g., Diffie-Hellman exchange values ("Ys"), server generated secrets, signatures for key exchange with server Diffie-Hellman parameters, or any combination thereof); public cipher suite parameters (e.g., "g" or "p" values of each cipher suite); block of elliptical curve exchange values for each of the FIPS 183 curves; or any combination thereof.

In several embodiments, the server device 406 tracks usage of the pre-populated values in a client session database to ensure that each server random number is used exactly once. This tracking of the pre-populated values mitigates the risk of a replay attack. The server device 406 can maintain the client session database to store sets of pre-populated values corresponding to server proxies (e.g., the server proxy 404) that interact with the server device 406.

The client device 402 can generate and send a client hello message at block 414. The client device 402 can send the client hello message to the server proxy 404. The client hello message can include a client random number generated at the client device 402.

In response to receiving the client hello message, at block 416, the server proxy 404 can forward the client hello message to the server device 406. At block 420, the server proxy 404 can generate the server hello message and the server certificate to send to the client device 402. The server proxy 404 can generate the server hello message based on at least one of the pre-populated server random numbers. The server proxy 404 can generate the server certificate based on at least one of the cipher suite parameters. The server proxy 404 can use the pre-populated values to construct the server hello message and the server certificate corresponding to the client hello message. For example, the server proxy 404 can select a timestamp and generate the server certificate and the server hello message based on that time stamp. The server proxy 404 can send the server hello message and the server certificate to the client device 402 (e.g., to continue the handshake) and to the server device 406 (e.g., to verify correctness and track proxy activity).

In response to receiving the server hello message and the server certificate, at block 426, the client device 402 can generate a client key exchange message, a client finished message, a client change spec message, or any combination thereof. The client device 402 can send the client key exchange message, the client finished message, and/or the client change spec message to the server proxy 404. The client device 402 can generate the client key exchange message based on the selected cipher suite and/or the cipher suite parameters (e.g., the server public key) indicated in the server hello message and the server certificate. The client device 402 can compute a Pre-Master Secret based on the server random number in the server hello message and the client random number in the client hello message. The client device 402 can encrypt the Pre-Master Secret with the server public key or other cipher suite parameters in the server certificate. The client device 402 can use the Pre-Master Secret to compute a Master Secret that can be used to generate a set of session keys. In response to computing the Master Secret, the client device 402 can generate the client change spec message indicating that the client device 402 is implementing a change of security protocol to start using the session keys to encrypt or sign future messages. In response to computing the Master Secret, the client device 402 can also generate the client finished message indicating that the client side of the TLS handshake is complete. The client finished message contains a signature of a checksum of all messages observed by the client device 402 prior to the generation of the client change spec message.

In some embodiments, instead of forwarding the server finished message from the server device 406 to the client device 402, the server proxy 404 can generate the server finished message and report the generated server finished message back to the server device 406. The server finished message can contain a signature of a checksum of all messages (e.g., including the client finished message) observed by the server proxy 404 and the server device 406. Because the server proxy 404 has observed the same messages as the server device 406, the server proxy 404 is able to generate the server finished message on behalf of the server device 406.

In response to receiving the client key exchange message, the client change spec message, and the client finished message, the server proxy 404 can forward these messages to the server device 406 at block 428. At block 438, the server device 406 can generate a server finished message based on the client finished message. The server finished message can contain a signature of a checksum of all messages observed in the TLS handshake thus far by the server device 406, including the client finished message. The server device 406 can also generate a server change spec message. At block 442, the server proxy 404 can forward the server finished message to the client device 402. In some embodiments, the server proxy 404 can hand off the TCP connection once the TLS protocol finishes.

In several embodiments, modification of the communication engine 410 of the server device 406 can be avoided by using both a client proxy and a server proxy. The client proxy can issue a client hello message to the server device 406 prior to receiving a corresponding client hello message from any client. In response, the server device 406 can send a server hello message containing all of the pre-populated values. The client proxy can then push these values to the server proxy. The server hello message is part of the TLS handshake that will time out with T_S seconds. If exactly one client issues a true client hello message for the server device 406 within T_S seconds, then the client proxy and server proxy 404 can conduct an untrusted edge proxy handshake.

In several embodiments, the method 400 reduces the number of roundtrips through the high-latency edge 408 from two to one for the TLS handshake. The method 400 has a security advantage because the server proxy 404 is untrusted, and thus there is no need to place private keys on the server proxy 404. The method 400 is also advantageous in that it does not change the TLS protocol. While the method 400 changes the server TLS implementation, it does not change the client TLS implementation.

Figure 5:
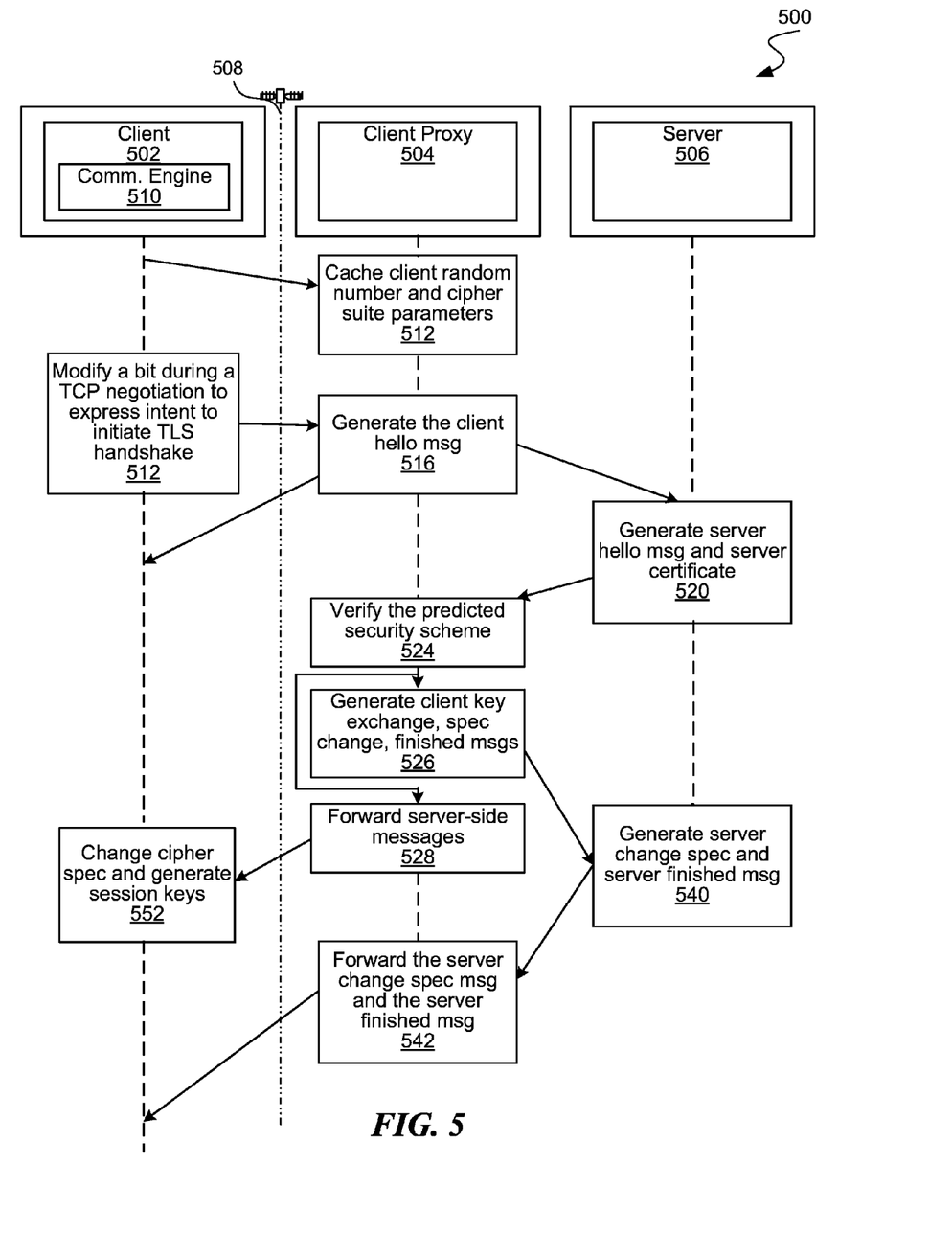
FIG. 5 is a flow chart illustrating a method of performing a TLS handshake utilizing a client proxy that implements an early proxy trigger, in accordance with various embodiments.

FIG. 5 is a flow chart illustrating a method 500 of performing a TLS handshake utilizing a client proxy that implements an early proxy trigger, in accordance with various embodiments. The method 500 can involve a client device 502 (e.g., the client device 222), a client proxy 504 (e.g., the client proxy 202B), and a server device 506 (e.g., the server device 208). In some embodiments, the client proxy 504 is a computing device (e.g., the computing device 600 of FIG. 6). In some embodiments, the client proxy 504 is a module implemented by executable instructions that runs on the server device 506 or on a device on the server side of a communication network, such as the high-latency rural network 200 of FIG. 2. A high-latency edge 508 (e.g., the backhaul network 206 of FIG. 2) represents a network chokepoint where communication of the TLS handshake may be delayed. In some embodiments, the client device 502 can implement a communication engine 510 that implements the process steps in the method 500 involving the client device 502. The communication engine 510 can introduce the client proxy 504 into the TLS handshake without modifying the TLS protocol.

In several embodiments, the client proxy 504 caches a set of client random numbers and a set of cipher suites and their corresponding cipher suite parameters at block 512. For example, the cipher suite parameters can include public parameters (e.g., "p", "g", and elliptic curve parameters) of a symmetric key exchange. The client device 502 can send the client random numbers and the cipher suite parameters asynchronous to an initiation of the TLS handshake. Unlike the method 300, in method 500, the client proxy 504 can use the cached client random numbers to generate a client hello message without the client device 502 sending the client hello message in the first place.

For example, at block 514, the client device 502 can modify a bit during a transmission control protocol (TCP) negotiation with the client proxy 504 to express an intent to use the TLS protocol. At block 516, in response to detecting the bit, the client proxy 504 can generate a client hello message on behalf of the client device 502. At block 516, the client proxy 504 can send the client hello message to both the server device 506 (e.g., to initiate the TLS handshake) and the client device 502 (e.g., to notify the client device 502 which client random number is used). If the client device 502 has a persistent connection to the client proxy 504, the intent to use can be expressed as a message over the persistent connection without putting a bit in TCP. The client proxy 504 can in response create a TCP connection to the right server.

At block 520, the server device 506 can generate and send a server hello message and a server certificate in response to receiving the client hello message. In several embodiments, block 520 can be similar or equivalent to block 320. At block 524, the client proxy 504 can verify that a selected cipher suite indicated in the server hello message corresponds to at least one of the cached cipher suites. In several embodiments, block 524 can be similar or equivalent to block 324.

At block 526, in response to determining that the selected cipher suite matches one of the cached cipher suites, the client proxy 504 can generate and send the client key exchange message to the server device 506 and the client device 502 (e.g., to verify correctness and to track the proxy activity). For example, the client key exchange can be based on the cached cipher suite parameters. At block 528, the client proxy 504 can send the server hello message and the server certificate to the client device 502. In some embodiments, the client proxy 504 can execute block 526 simultaneously to or immediately before block 528. In some embodiments, the client proxy 504 can execute block 526 immediately after block 528. In several embodiments, the process step described in blocks 526 and 528 can be the same or similar to the process steps described in blocks 326 and 328.

At block 532, the client device 502 can change the cipher specification by generating session keys based on the negotiated parameters (e.g., the server random number, the client random number, and the selected cipher suite parameters). To generate the sessions keys, the client device 502 can compute a Master Secret for the TLS session. The client device 502 can generate the Master Secret based on the Pre-Master Secret, the client random number, and the server random number. Block 532 can be in response to block 528. The client device 502 can use the session keys to encrypt and sign future messages to the server device 506 and decrypt and authenticate future messages from the server device 506. In some embodiments, block 532 can be similar or equivalent to block 332.

At block 540, the server device 506 can generate a server finished message and a server change spec message based on the client finished message, the client key exchange message, and the client finished message (e.g., all sent by the client proxy 504 at block 526). The server device 506 can send the server finished message and the server change spec message to the client proxy 504. In several embodiments, block 540 can be similar or equivalent to block 340. At block 542, the client proxy 504 can forward the server finished message and the server change spec message to the client device 502 to complete the TLS handshake. In several embodiments, block 542 can be similar to or equivalent to block 342.

While processes or blocks are presented in a given order in this application, alternative implementations may perform routines having steps performed in a different order, or employ systems having blocks in a different order. Some processes or blocks may be deleted, moved, added, subdivided, combined, and/or modified to provide alternative or subcombinations. Also, while processes or blocks are at times shown as being performed in series, these processes or blocks may instead be performed or implemented in parallel, or may be performed at different times.

Functional components (e.g., engines, modules, devices and executable instructions) associated with each of the computing devices or systems described in the above figures can be implemented as circuitry, firmware, software, or other functional instructions. For example, the functional components can be implemented in the form of special-purpose circuitry, in the form of one or more appropriately programmed processors, a single board chip, a field programmable gate array, a network-capable computing device, a virtual machine, a cloud computing environment, or any combination thereof. For example, the functional components described can be implemented as instructions on a tangible storage memory capable of being executed by a processor or other integrated circuit chip. The tangible storage memory may be volatile or non-volatile memory. In some embodiments, the volatile memory may be considered "non-transitory" in the sense that it is not a transitory signal. Memory space and storages described in the figures can be implemented with the tangible storage memory as well, including volatile or non-volatile memory.

Each of the functional components may operate individually and independently of other functional components. Some or all of the functional components may be executed on the same host device or on separate devices. The separate devices can be coupled through one or more communication channels (e.g., wireless or wired channel) to coordinate their operations. Some or all of the functional components may be combined as one component. A single functional component may be divided into sub-components, each sub-component performing separate method step or method steps of the single component.

In some embodiments, at least some of the functional components share access to a memory space. For example, one functional component may access data accessed by or transformed by another functional component. The functional components may be considered "coupled" to one another if they share a physical connection or a virtual connection, directly or indirectly, allowing data accessed or modified by one functional component to be accessed in another functional component. In some embodiments, at least some of the functional components can be upgraded or modified remotely (e.g., by reconfiguring executable instructions that implements a portion of the functional components). The systems, engines, or devices described may include additional, fewer, or different functional components for various applications.

FIG. 6 is a block diagram of an example of a computing device 600, which may represent one or more computing device or server described herein, in accordance with various embodiments. The computing device 600 can be one or more computing devices that implement the client proxy 202B, the server proxy 202A, the server device 208, or the client device 222 of FIG. 2. The computing device 600 can implement methods and processes described in this disclosure (e.g., the method 300, the method 400, and/or the method 500). The computing device 600 includes one or more processors 610 and memory 620 coupled to an interconnect 630. The interconnect 630 shown in FIG. 6 represents any one or more separate physical buses, point-to-point connections, or both connected by appropriate bridges, adapters, or controllers. The interconnect 630, therefore, may include, for example, a system bus, a Peripheral Component Interconnect (PCI) bus or PCI-Express bus, a Hyper- Transport or industry standard architecture (ISA) bus, a small computer system interface (SCSI) bus, a universal serial bus (USB), IIC (I2C) bus, or a "Firewire".

The processor(s) 610 is/are the central processing unit (CPU) of the computing device 600 and thus controls the overall operation of the computing device 600. In certain embodiments, the processor(s) 610 accomplishes this by executing software or firmware stored in memory 620. The processor(s) 610 may be, or may include, one or more programmable general-purpose or special-purpose microprocessors, digital signal processors (DSPs), programmable controllers, application specific integrated circuits (ASICs), programmable logic devices (PLDs), trusted platform modules (TPMs), or the like, or a combination of such devices.

The memory 620 is or includes the main memory of the computing device 600. The memory 620 represents any form of random access memory (RAM), read-only memory (ROM), flash memory, or the like, or a combination of such devices. In use, the memory 620 may contain a code 670 containing instructions according to the mesh connection system disclosed herein.

Also connected to the processor(s) 610 through the interconnect 630 are a network adapter 640 and a storage adapter 650. The network adapter 640 provides the computing device 600 with the ability to communicate with remote devices, over a network and may be, for example, an Ethernet adapter or Fibre Channel adapter. The network adapter 640 may also provide the computing device 600 with the ability to communicate with other computers. The storage adapter 650 enables the computing device 600 to access a persistent storage, and may be, for example, a Fibre Channel adapter or SCSI adapter.

The code 670 stored in memory 620 may be implemented as software and/or firmware to program the processor(s) 610 to carry out actions described above. In certain embodiments, such software or firmware may be initially provided to the computing device 600 by downloading it from a remote system through the computing device 600 (e.g., via network adapter 640).

The techniques introduced herein can be implemented by, for example, programmable circuitry (e.g., one or more microprocessors) programmed with software and/or firmware, or entirely in special-purpose hardwired circuitry, or in a combination of such forms. Special-purpose hardwired circuitry may be in the form of, for example, one or more application-specific integrated circuits (ASICs), programmable logic devices (PLDs), field-programmable gate arrays (FPGAs), etc.

Software or firmware for use in implementing the techniques introduced here may be stored on a machine-readable storage medium and may be executed by one or more general-purpose or special-purpose programmable microprocessors. A "machine-readable storage medium," as the term is used herein, includes any mechanism that can store information in a form accessible by a machine (a machine may be, for example, a computer, network device, cellular phone, personal digital assistant (PDA), manufacturing tool, any device with one or more processors, etc.). For example, a machine-accessible storage medium includes recordable/non-recordable media (e.g., read-only memory (ROM); random access memory (RAM); magnetic disk storage media; optical storage media; flash memory devices; etc.), etc.

The term "logic," as used herein, can include, for example, programmable circuitry programmed with specific software and/or firmware, special-purpose hardwired circuitry, or a combination thereof.

What is claimed is:

1. A computer-implemented method of operating a client proxy, comprising:
    sending a client hello message from the client proxy to initiate an authentication protocol handshake with a server device on behalf of a client device;
    receiving, at the client proxy, a server hello message and a server certificate from the server device;
    in response to receiving the server hello message, forwarding, from the client proxy to the client device, the server hello message and the server certificate; and
    in response to receiving the server hello message, generating, at the client proxy, a client key exchange message and a client finished message to send to the server device on behalf of the client device to perform the authentication protocol handshake; and
    establishing, based on at least the client key exchange message, a secured network session between the client device and the server device to transport computer network data;
    wherein the client proxy connects with the client device at a higher latency delay than with the server device.

2. The computer-implemented method of claim 1, further comprising:
    generating the client hello message in response to detecting a modified bit in a transmission control protocol (TCP) negotiation;
    wherein the client proxy is configured to recognize the modified bit as an intend to initiate the authentication protocol handshake; and
    wherein sending the client hello message includes sending the generated client hello message.

3. The computer-implemented method of claim 2, further comprising:
    receiving a plurality of client random numbers from the client device before and asynchronous from sending the client hello message to the server device; and
    wherein the generated client hello message includes a client random number from the plurality of client random numbers.

4. The computer-implemented method of claim 3, further comprising:
    tracking the client random number included in the generated client hello message in a client session database.

5. The computer-implemented method of claim 3, further comprising:
    receiving a plurality of cipher suite parameters according to one or more cipher suites from the client device before and asynchronous from sending the client hello message to the server device; and
    wherein generating the client key exchange message at the client proxy is based on at least a subset of the plurality of cipher suite parameters.

6. The computer-implemented method of claim 1, further comprising:
    receiving the client hello message from the client device at the client proxy; and wherein sending the client hello message from the client proxy to the server device is in response to receiving the client hello message at the client proxy.

7. The computer-implemented method of claim 6, further comprising:
    receiving a cipher suite prediction from the client device when receiving the client hello message; and
    wherein generating the client key exchange message is based on the cipher suite prediction.

8. The computer-implemented method of claim 7, further comprising:
verifying that the cipher suite prediction matches a cipher suite indicated in the server hello message; and
wherein generating the client key exchange message is in response to verifying that the cipher suite prediction matches the cipher suite.

9. The computer-implemented method of claim 1, wherein the server device is oblivious that the client proxy is proxying for the client device.

10. The computer-implemented method of claim 1, wherein the server device is oblivious of the existence of the client device.

11. A server proxy comprising:
a physical processor configured to execute instructions to implement a process, wherein the process includes:
pre-populating a server random number and a server cipher suite parameter from a server device to the server proxy;
receiving, at the server proxy, a client hello message from a client device to initiate an authentication protocol handshake with the server device;
in response to receiving the client hello message, generating, at the server proxy, a server hello message and a server certificate message based on the server random number and the server cipher suite parameter to send to the client device; and
in response to receiving the client hello message, forwarding the client hello message from the server proxy to the server device; and
establishing, based on at least the client hello message, a secured network session between the client device and the server device to transport computer network data;
wherein the client device is oblivious that the server proxy is proxying for the server device and wherein the server device is oblivious of existence of the client device.

12. The server proxy of claim 11, wherein said receiving the server random number includes receiving a plurality of server random numbers and a plurality of server cipher suite parameters.

13. The server proxy of claim 11, wherein said receiving the server random number is prior to and asynchronous from receiving the client hello message that initiates the authentication protocol handshake.

14. The server proxy of claim 11, wherein sending to or receiving from the server device involves communicating through a backhaul network.

15. The server proxy of claim 11, wherein the process further includes:
receiving a client key exchange message, a client change spec message, and a client finished message from the client device; and
forwarding the client key exchange message, the client change spec message, and the client finished message to the server device.

16. The server proxy of claim 11, wherein the process further includes:
receiving a server change spec message and a server change spec message from the server device; and
forwarding the server change spec message and the server finished message to the client device.

17. A non-transitory computer-readable storage memory storing computer-executable instructions comprising:
instructions for tracking a prediction of a cipher suite having a set of cipher suite parameters associated with a server device;
instructions for sending the set of cipher suite parameters to a client proxy serving on behalf of a client device;
instructions for initiating an authentication protocol handshake with the server device via the client proxy;
instructions for receiving a server hello message and a server certificate from the client proxy;
instructions for generating a set of session keys based on the server hello message and the server certificate in response to receiving the server hello message; and
instructions for establishing, based on at least the set of session keys, a secured network session between the client device and the server device to transport computer network data,
wherein the client proxy connects with the client device at a higher latency delay than with the server device.

18. The non-transitory computer-readable storage memory of claim 17, further comprising:
instructions for generating a client hello message; and
instructions for sending the client hello message along with the set of cipher suite parameters to the client proxy.

19. The non-transitory computer-readable storage memory of claim 17, further comprising:
instructions for generating a set of client random numbers; and
instructions for sending the set of client random numbers along with the set of cipher suite parameters to the client proxy.

* * * * *